(12) United States Patent
Vestermark Vad

(10) Patent No.: US 10,256,679 B2
(45) Date of Patent: Apr. 9, 2019

(54) ROTOR FOR AN ELECTRIC MOTOR

(71) Applicant: GRUNDFOS HOLDING A/S, Bjerringbro (DK)

(72) Inventor: Martin Vestermark Vad, Randers NØ (DK)

(73) Assignee: GRUNDFOS HOLDING A/S, Bjerringbro (DK)

(*) Notice: Subject to any disclaimer, the term of this patent is extended or adjusted under 35 U.S.C. 154(b) by 254 days.

(21) Appl. No.: 14/436,271

(22) PCT Filed: Oct. 21, 2013

(86) PCT No.: PCT/EP2013/071945
§ 371 (c)(1),
(2) Date: Apr. 16, 2015

(87) PCT Pub. No.: WO2014/064037
PCT Pub. Date: May 1, 2014

(65) Prior Publication Data
US 2015/0249367 A1 Sep. 3, 2015

(30) Foreign Application Priority Data
Oct. 26, 2012 (EP) .................................... 12190107

(51) Int. Cl.
| H02K 1/27 | (2006.01) |
| H02K 15/02 | (2006.01) |
| H02K 1/02 | (2006.01) |
| H02K 15/03 | (2006.01) |

(52) U.S. Cl.
CPC ............. *H02K 1/02* (2013.01); *H02K 1/2706* (2013.01); *H02K 1/2733* (2013.01); *H02K 15/02* (2013.01); *H02K 15/03* (2013.01)

(58) Field of Classification Search
CPC ........ H02K 1/2733; H02K 15/03; H02K 1/02; H02K 1/2706
USPC ............... 310/43; 29/296, 598; 148/101–103
See application file for complete search history.

(56) References Cited

U.S. PATENT DOCUMENTS

| 3,909,647 A * | 9/1975 | Peterson | H01F 1/086 310/156.12 |
| 4,433,261 A * | 2/1984 | Nashiki | H02K 1/278 310/156.28 |
| 5,495,658 A * | 3/1996 | Teshigawara | H02K 15/03 264/272.2 |

(Continued)

FOREIGN PATENT DOCUMENTS

| DE | 103 07 231 A1 | 9/2004 |
| DE | 10 2006 000 446 A1 | 3/2007 |

(Continued)

OTHER PUBLICATIONS

Shibata, English Machine Translation, JP 2005-065370, Mar. 2005.*

*Primary Examiner* — Burton S Mullins
(74) *Attorney, Agent, or Firm* — McGlew and Tuttle, P.C.

(57) ABSTRACT

The rotor for an electric motor includes a central rotor shaft (2) and a permanent-magnetic rotor body fastened on the rotor shaft. The rotor body is provided with a casing (8) which is radially distanced to the rotor shaft (2). A first annular space, which is adjacent the casing (8) and which is molded out with a plastic (10) at least partly containing magnet particles, is formed between the rotor shaft (2) and the casing (8).

16 Claims, 3 Drawing Sheets

(56) References Cited

U.S. PATENT DOCUMENTS

| | | | |
|---|---|---|---|
| 6,186,756 B1* | 2/2001 | Kojima | F04C 29/0071 310/43 |
| 6,489,696 B2* | 12/2002 | Sashino | H02K 1/2733 310/156.01 |
| 6,578,251 B2* | 6/2003 | Kliman | H02K 3/493 264/122 |
| 6,765,319 B1* | 7/2004 | Thompson | H01F 1/0578 310/156.08 |
| 7,709,991 B2* | 5/2010 | Ionel | H02K 1/22 310/156.74 |
| 2001/0030475 A1 | 10/2001 | Kliman et al. | |
| 2007/0052310 A1* | 3/2007 | Sakai | F02M 37/048 310/87 |
| 2007/0138903 A1* | 6/2007 | Chang | H02K 1/2733 310/261.1 |
| 2008/0315691 A1 | 12/2008 | Jeung | |
| 2010/0066189 A1* | 3/2010 | Horng | H02K 1/28 310/156.09 |

FOREIGN PATENT DOCUMENTS

| | | |
|---|---|---|
| DE | 10 2006 036 392 A1 | 11/2007 |
| DE | 10 2007 029 738 A1 | 1/2009 |
| DE | 10 2012 100 693 A1 | 8/2013 |
| EP | 1 722 457 A2 | 11/2006 |
| EP | 2 390 986 A1 | 11/2011 |
| EP | 2 511 532 A1 | 10/2012 |
| JP | 35961458 A | 4/1984 |
| JP | H01129741 A | 5/1989 |
| JP | H02307341 A | 12/1990 |
| JP | H03190541 A | 8/1991 |
| JP | H06193583 A | 7/1994 |
| JP | H06275426 A | 9/1994 |
| JP | H0799743 A | 4/1995 |
| JP | H10174327 A | 6/1998 |
| JP | 2000102201 A | 4/2000 |
| JP | 2001178040 A | 6/2001 |
| JP | 2001178086 A | 6/2001 |
| JP | 2005 065370 A | 3/2005 |
| JP | 2011-239546 A | 11/2011 |
| KR | 1020060133865 A | 12/2006 |

* cited by examiner

ROTOR FOR AN ELECTRIC MOTOR

CROSS REFERENCE TO RELATED APPLICATIONS

This application is a United States National Phase Application of International Application PCT/EP2013/071945 filed Oct. 21, 2013 and claims the benefit of priority under 35 U.S.C. § 119 of European Patent Application EP12190107.8 filed Oct. 26, 2012, the entire contents of which are incorporated herein by reference.

FIELD OF THE INVENTION

The invention relates to a rotor for an electric motor with for an electric motor with a central rotor shaft and with a permanent-magnetic rotor body fastened on the rotor shaft, as well as to an electric motor with such a rotor, to a pump assembly with such an electric motor and to a method for manufacturing such a rotor.

BACKGROUND OF THE INVENTION

With electric motors with a permanent magnet rotor, it is necessary to arrange permanent magnets in the rotor. For this, it is known for example to design a rotor body of iron laminations and to insert permanent magnets in recesses in the iron laminations. It is also known to design the rotor body of a permanently magnetizable material and to form the electromagnets in the rotor body by way of magnetization. The rotor body as a rule is connected to a central rotor shaft in a rotationally fixed manner.

SUMMARY OF THE INVENTION

It is an object of the invention, to improve a rotor for an electric motor to the extent that the electric motor is simpler to manufacture.

The rotor according to the invention, for an electric motor, in the known manner comprises a central rotor shaft, on which a permanent-magnetic rotor body is fastened. I.e. the rotor body comprises permanent-magnetic magnet poles. According to the invention, the rotor body is manufactured of a plastic material. The rotor body for this comprises a casing which is radially distanced to the rotor shaft. This casing is arranged such that a first annular space directly adjacent the inner periphery of the casing is formed between the rotor shaft and the inner periphery of the casing. This annular space is molded out with a plastic, in a manner such that the plastic is molded directly onto the casing. The plastic thus bears directly on the inner periphery of the casing and according to a first preferred embodiment, also on the outer periphery of the rotor shaft and thus creates a connection to the casing and, as the case may be, to the rotor shaft. Thereby, a positive-fit and/or material-fit connection between the plastic and the casing as well as, as the case may be, the rotor shaft occurs. The plastic furthermore simultaneously forms the rotor body. For this, magnet particles are embedded into the plastic and ensure that the rotor body has the desired permanent-magnetic characteristics. Thereby, it is preferably the case of magnet particles which are magnetizable from the outside and then retain the permanent-magnetic characteristics produced by the magnetization. Thus, the rotor can be formed in a very simple manner by way of the magnet particles being added to the plastic before the injection molding and, by way of casting or injecting moulding, the rotor body then being formed and simultaneously the connection to the surrounding casing and, as the case may be, to the rotor shaft being created. The defined magnetization for forming magnet poles can then be effected subsequently to this.

The casing is preferably designed such that it is elastically and/or plastically deformed by way of molding in the plastic, which is preferably effected with injection molding under pressure. A prestressing can be produced by way of the elastic deformation and this prestressing has the effect of a radially inwardly directed pressure on the plastic material and thus ensures that the rotor body is held together. Thus, a shrinking of the plastic when cooling down can then be compensated by way of the elasticity, so that a secure bearing of the casing on the plastic and, as the case may be, a secure bearing contact of the plastic on the rotor shaft is ensured, even with a shrinkage.

The casing is preferably manufactured of metal, in particular of a stainless steel. The casing surrounds the rotor body formed from the plastic, in outer peripheral manner and can form part of an encapsulation of the plastic with the magnet particles. This is particularly advantageous with wet-running electric motors as are applied with pump assemblies, since the magnet particles can be protected from corrosion by way of such an encapsulation.

The casing preferably has a closed peripheral surface for encapsulation.

According to a further preferred embodiment, the rotor shaft is surrounded by a soft-magnetic ring, in particular in the form of an iron ring, and the first annular space is formed between the outer periphery of the soft-magnetic ring and the casing. The soft-magnetic ring serves for closing the magnetic circuit in the rotor, so that e.g. a rotor shaft of a non-magnetic material can also be applied. The plastic material with the magnet particles and which forms the permanent-magnetic rotor body is thereby molded in between the outer periphery of this soft-magnetic ring and the inner periphery of the casing, so that it is molded onto the ring and the casing and creates a firm connection between the ring and the casing.

The soft-magnetic ring is further preferably designed such that it is arranged radially distanced to the rotor shaft. I.e. a second annular space is formed between the soft-magnetic ring and the outer periphery of the rotor shaft. This second annular space is preferably likewise molded out with plastic. The plastic is molded onto the ring and the rotor shaft and bears on the outer periphery of the rotor shaft and on the inner periphery of the soft-magnetic ring and firmly connects these to one another with a positive-fit and/or material-fit. With this plastic, it is further preferably the case of a plastic, to which no magnet particles are added.

At least the first annular space of the rotor body which is adjacent the surrounding casing, is preferably covered by a shroud on at least one axial side, preferably on both axial sides. The shroud thus preferably together with the casing forms an encapsulation of the plastic with the magnet particles, so that the magnet particles are arranged in a closed space and thus protected from moisture. This serves for corrosion protection, which is particularly advantageous with the use of the rotor in a wet-running electric motor.

The at least one shroud is preferably manufactured of metal. Inasmuch as two shrouds are present, preferably both shrouds are manufactured of metal. Particularly preferably, with regard to the metal, it is the case of stainless steel.

The at least one shroud can be connected, in particular welded, to the casing and/or to a soft-magnetic ring surrounding the rotor shaft. Thus, the casing with the shrouds arranged on both axial ends and with the radially inner-lying, soft-magnetic ring can form a sealed encapsulation for the plastic with the magnet particles. Alternatively, the shrouds on the inner periphery can also be connected directly to the rotor shaft, e.g. if no soft-magnetic ring is present.

The magnet particles preferably contain neodymium and/or ferrite or are formed completely of neodymium or ferrite. The use of neodymium permits the production of strong magnetic fields with a simultaneously compact construction.

The rotor shaft is preferably manufactured of ceramic. This has the advantage that one can make do without bearing elements or bearing inserts, since the rotor shaft itself has the required bearing properties and can come into bearing sliding contact directly in a surrounding bearing ring. With the use of a rotor shaft of ceramic, the inner ring of soft-magnetic material described above has the advantage that it ensures the magnetic flux in the rotor if the rotor shaft itself has no soft-magnetic properties.

According to a further preferred embodiment, profilings are formed on the outer periphery of the rotor shaft, on the inner periphery of the casing and/or on the surface of a soft-magnetic ring surrounding the rotor shaft. These profilings serve for creating an improved connection to the molded-on plastic. Particularly preferably, grooves are incorporated on the outer periphery of the rotor shaft, for example ground into a ceramic shaft. Thereby, the grooves are preferably incorporated such that they at least partly extend obliquely to the peripheral direction, so that a force transmission by way of a positive-fit engagement in the peripheral direction and in the axial direction is possible, in order to thus fix the plastic on the shaft in both directions with a positive fit. Inasmuch as a soft-magnetic ring is arranged surrounding the rotor shaft, then preferably corresponding grooves are also formed on the outer periphery and/or on the inner periphery of the ring. Thereby, grooves are also preferably provided, which preferably extend inclined to the peripheral direction. Ideally, grooves are provided which extend in the peripheral direction, as well as grooves which extend obliquely. Corresponding grooves can also be formed on the inner periphery of the casing. Inasmuch as grooves extending obliquely to the peripheral direction are formed on one of the mentioned surfaces, these are preferably designed such that at least two grooves are provided, which run inclined in opposite directions. Thus, a prestressing between the plastic and the component provided with the grooves can be achieved. Instead of grooves, suitably shaped projections or another suitable profiling which ensures a positive-fit engagement to the plastic can also be formed.

Apart from the rotor, an electric motor which comprises a rotor according to the preceding description is also the subject matter of the invention. Thereby, it is particularly the case of a wet-running electric motor, i.e. a canned motor. The subject matter of the invention is moreover a pump assembly with such an electric motor. With regard to this pump assembly it can for example be the case of a circulation pump assembly, in particular a heating circulation pump assembly. The previously described rotor indeed has advantages in such a pump assembly, since it can be manufactured inexpensively, has strong magnetic properties and moreover permits a complete encapsulation of the corrosion-sensitive magnet material by the surrounding casing, the shrouds and the inner-lying, soft-magnetic ring or the rotor shaft. Thus, the rotor can be well applied in a wet-running electric motor, as is used with drive motors of pump assemblies.

The subject-matter of the invention is furthermore a method for manufacturing a rotor for an electric motor, in particular a rotor, as has been previously described. The method according to the invention has the following steps:

In one step of the method, a casing which surrounds the rotor shaft in a radially distanced manner in the rotor is applied into an injection molding tool, wherein in the tool, a first annular space is formed on the inner periphery of the casing which later faces the rotor shaft.

In the next step, a plastic in which magnet particles are previously incorporated is injected into this annular space. Thereby, the plastic preferably comes to bear directly on the inner periphery of the casing and creates a firm connection with the casing. According to the first preferred embodiment, the rotor shaft is simultaneously applied with the casing into an injection molding tool and the first annular space extends from the outer periphery of the rotor shaft up to the inner periphery of the casing. This annular space is then completely filled with the plastic in which magnet particles are incorporated According to a second preferred embodiment, a soft-magnetic ring surrounding the rotor shaft at a distance is applied together with the rotor shaft into an injection molding tool, so that a second annular space is formed between the ring and the rotor shaft. This second annular space is molded out with a plastic. Thereby, it can be the case of a plastic without magnet particles. The first annular space which was described previously is formed between the outer periphery of the soft-magnetic ring and the casing, and this first annular space is molded out with the plastic containing the magnet particles. The injecting of the first and the second annular space can be effected simultaneously. Preferably, this however is effected in steps, so that firstly the second annular space between the soft-magnetic ring and the rotor shaft is molded out and in a second step the first annular space between the soft-magnetic ring and the casing is molded out. Alternatively, also firstly the soft-magnetic ring and the casing can be applied into an injection molding tool such that the first annular space is formed between them and this first annular space is then molded out with the plastic containing magnet particles. This thus premanufactured subassembly then together with a rotor shaft can then be applied into an injection molding tool, wherein the second annular space between the soft-magnetic ring and the rotor shaft is then molded out with plastic as described. Such a molding in two steps has the advantage that two different plastics can be used, on the one hand a plastic without magnet particles and on the other hand the plastic with magnet particles, for filling out the first annular apace. The molding out of the first and second annular space can either be effected in the same injection molding tool, wherein cores which close the spaces which are not to be molded out in the respective step, are used as the case may be, or two different tools can be used and the subassembly premanufactured in the first tool can then be applied into the second tool for molding the respective other annular space. If only one tool is used, preferably the casing cannot be applied into the tool until after molding out the second annular space between the soft-magnetic ring and the rotor shaft. Thus, on molding out the second annular space, in a first step firstly the surrounding space of the soft-magnetic ring is filled by a mould part such as a core, which is then removed or displaced for molding the first annular space, in order to form this annular space.

The tool is preferably designed such that the casing can be elastically or plastically expanded by a certain amount in the radial direction, in order to produce a prestressing as has been described above.

Particularly preferably, the tool is designed such that all components to be molded in can be applied into the tool at the beginning of the manufacturing procedure in one working run, i.e. the rotor shaft, the soft-magnetic ring and the casing are preferably applied into the injection molding tool before the first molding-out of the second annular space.

The shrouds described above are further preferably attached after the molding and then welded to the casing and the rotor shaft or to the casing and the soft-magnetic ring. Moreover, the magnetization for forming permanent-magnetic poles in the rotor body is preferably also carried out after the complete molding of the rotor body.

The invention is hereinafter described by way of example and by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
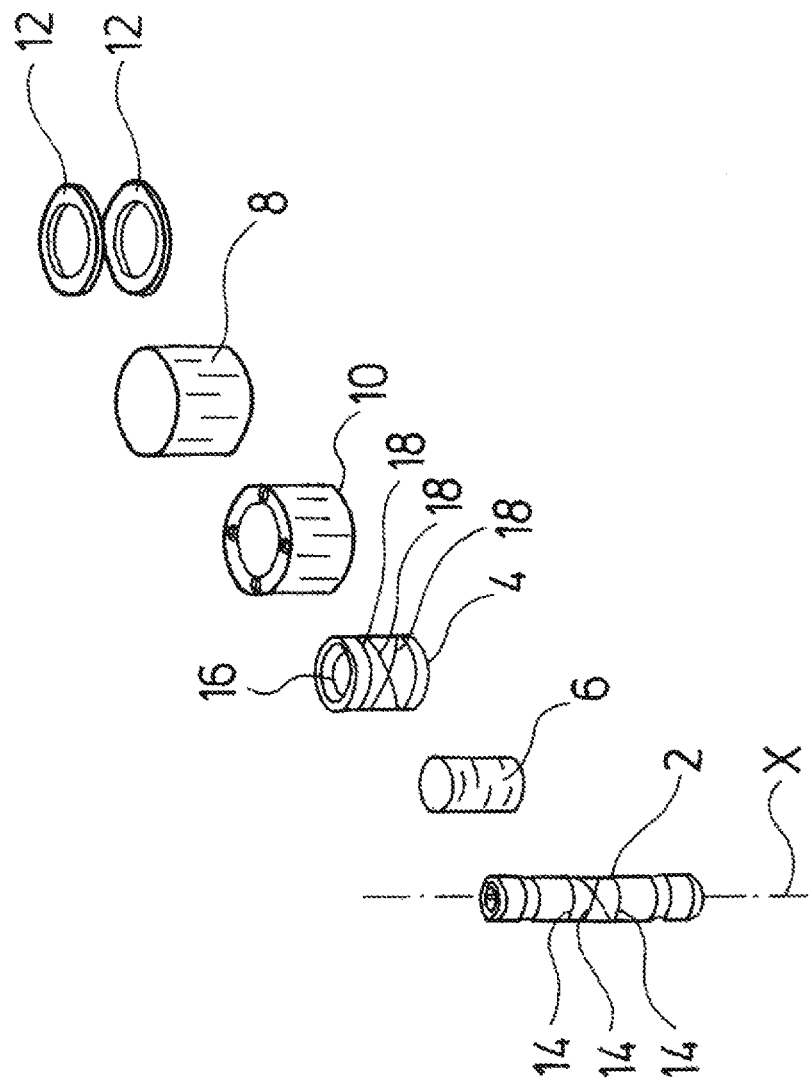
FIG. 1 is an exploded view of the rotor according to the invention.
Figure 2:
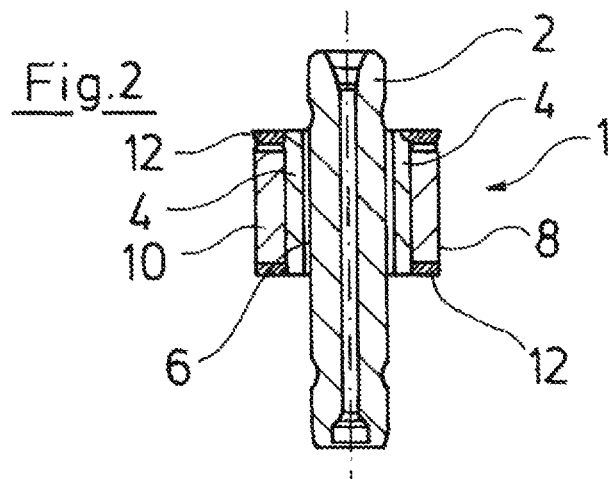
FIG. 2 is a sectioned view of the rotor according to FIG. 1.
Figure 3:
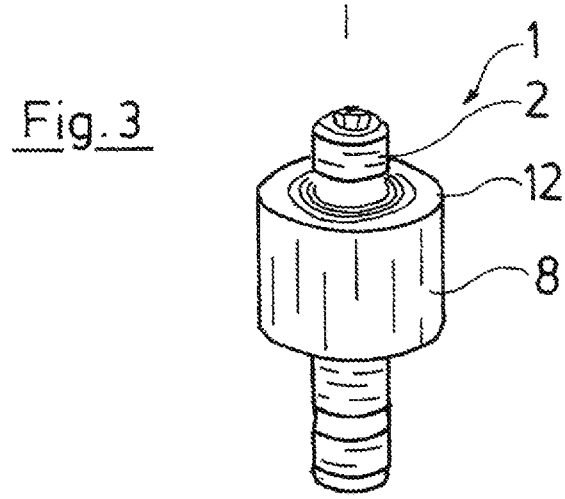
FIG. 3 is a perspective entire view of the rotor according to FIG. 1.
Figure 4:
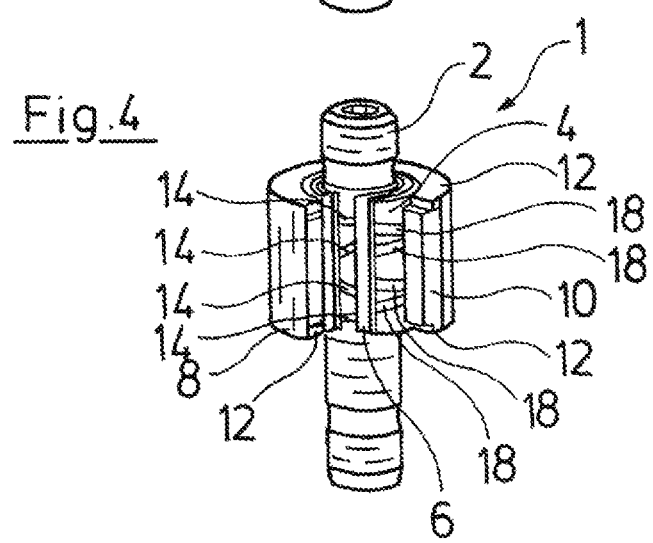
FIG. 4 is a partly sectioned view of the rotor according to FIG. 1.

The rotor 1 shown in the figures, according to a preferred embodiment of the invention comprises a central shaft 2 of a ceramic material. An iron ring 4 is arranged in a radially distanced manner with respect to the longitudinal axis X of the shaft 2. This soft-magnetic ring in the form of an iron ring 4 is distanced radially such that an annular space remains between the inner periphery of the iron ring 4 extending concentrically to the longitudinal axis X, and the outer periphery of the shaft 2. This annular space is filled by a plastic 6. The plastic 6 is incorporated into the free space between the iron ring 4 and the shaft 2 with injection molding, and connects the iron ring 4 to the shaft 2 with a material-fit or positive-fit.

A casing 8 is arranged radially outside the iron ring 4. This casing 8 is formed of stainless steel and has a sleeve shape of a circularly cylindrical fashion. The inner periphery of the casing 8 is distanced radially to the outer periphery of the iron ring 4, so that an annular space is formed between the casing 8 and iron ring 4. This annular space is filled out by a plastic material 10 with embedded magnet particles. The plastic 10 with the embedded magnet particles, for example neodymium particles, is molded into the annular space between the casing 8 and the iron ring 4 with injection molding, so that it simultaneously creates a firm connection between the iron ring 4 and the casing 8, for example by way of a positive-fit and/or material fit. On injecting the plastic 10, the casing 8 is preferably expanded in the radial direction, so that an elastic deformation occurs, which leads to a radially inwardly directed prestressing. This ensures that the individual layers, specifically the casing 8, the plastic 10, the iron ring 4 and the plastic 6 are held on the shaft 2 in a fixed and firm manner, even if the plastic should shrink.

The axial ends of the thus formed rotor body are covered by two shrouds 12 which are likewise manufactured of stainless steel, as with the casing 8. The shrouds 12 have an annular fashion with an annular width which corresponds to the width of the first annular space between the iron ring 4 and the casing 8. Thus, the shrouds 12 at the outer periphery can be welded to the casing 8 and at their inner periphery to the iron ring 4, so that the plastic 10 with the embedded magnet particles is completely encapsulated in a water-tight manner in the inside of the first annular space enclosed by the casing 8, the shrouds 12 and the iron ring 4. Thus, the magnet material is protected in the plastic 10 against corrosion. It would alternatively also be conceivable to weld the inner periphery of the shrouds 12 to the shaft 2, e.g. if this shaft is not manufactured of ceramic but of metal. In this case, one can possibly make do without the inner iron ring 4 and the plastic 6 in the second annular space, since then the magnetic flux could then be ensured by the material of the shaft 2. In this case, the first annular space could reach up to the outer periphery of the shaft 2 and the plastic 10 extend up to the shaft 2.

On manufacture, preferably firstly the shaft 2, the iron ring 4 and the casing 8 are applied into an injection molding tool, wherein the injection molding tool is designed such that the components are held in a defined position to one another. Subsequently, preferably firstly the plastic 6 is injected into the second annular space between the shaft 2 and the iron ring 4. Subsequently, in a second step, the plastic 10 with the magnet particles is injected into the first annular space between the iron ring 4 and the casing 8. The tool is thereby preferably designed such that the casing 8 can expand in the peripheral direction or radial direction, in order to produce the described prestressing. The first annular space between the iron ring 4 and the casing 8 can be closed by a suitable core during the injection molding of the plastic 6 in the second annular space. Alternatively, the injection molding can also be affected in two steps in two tools. Thus, in a first tool, firstly the casing 8 with the iron ring can be connected or molded to one another by way of molding out the first annular space formed between these, with the plastic 10. This thus premanufactured subassembly can then together with the rotor shaft 2 be applied into a second tool, wherein then the annular space formed between the iron ring 4 and the rotor shaft 2 can be molded by the plastic 6, in order to firmly connect the iron ring 4 to the rotor shaft 2.

Grooves are 14 are incorporated in the outer periphery of the shaft 2 and grooves 16 on the inner periphery of the iron ring 4, in order to achieve an improved connection between the plastic 6 and the shaft 2 as well as the iron ring 4. The grooves 14 can for example be ground into the outer periphery of the shaft 2. The grooves 14 and 16 ensure a positive-fit engagement of the plastic 6 with the iron ring 4 and the shaft 2. The grooves 14 and 16 comprise grooves extending in the peripheral direction as well as obliquely to the peripheral direction. Thereby, as is shown with the example of the shaft 2, two crossing, obliquely running grooves are provided, in order to achieve a tensioning between the plastic 6 and the shaft 2 or iron ring 4. Thereby, the grooves 14 and 16 extend such that a force transmission is possible by way of a positive-fit in the axial as well as in the peripheral direction.

Moreover, grooves 18 are formed on the outer periphery of the iron ring 4 for improving the connection of the plastic 10 to the iron ring 4. These grooves, as described previously by way of the grooves 14 and 16, likewise extend in the peripheral direction and obliquely to the peripheral direction, so that a positive-fit engagement is also achieved between the plastic 10 and the iron ring 4, and this engagement permits a force transmission in the axial as well as in the peripheral direction.

The magnetization of the magnet particles in the plastic 10 is effected at a later point in time, in order to then be able to form defined magnet poles with permanent-magnetic properties. The shrouds 12 are also welded in the described manner after injection molding the plastic 10.

Figure 5:
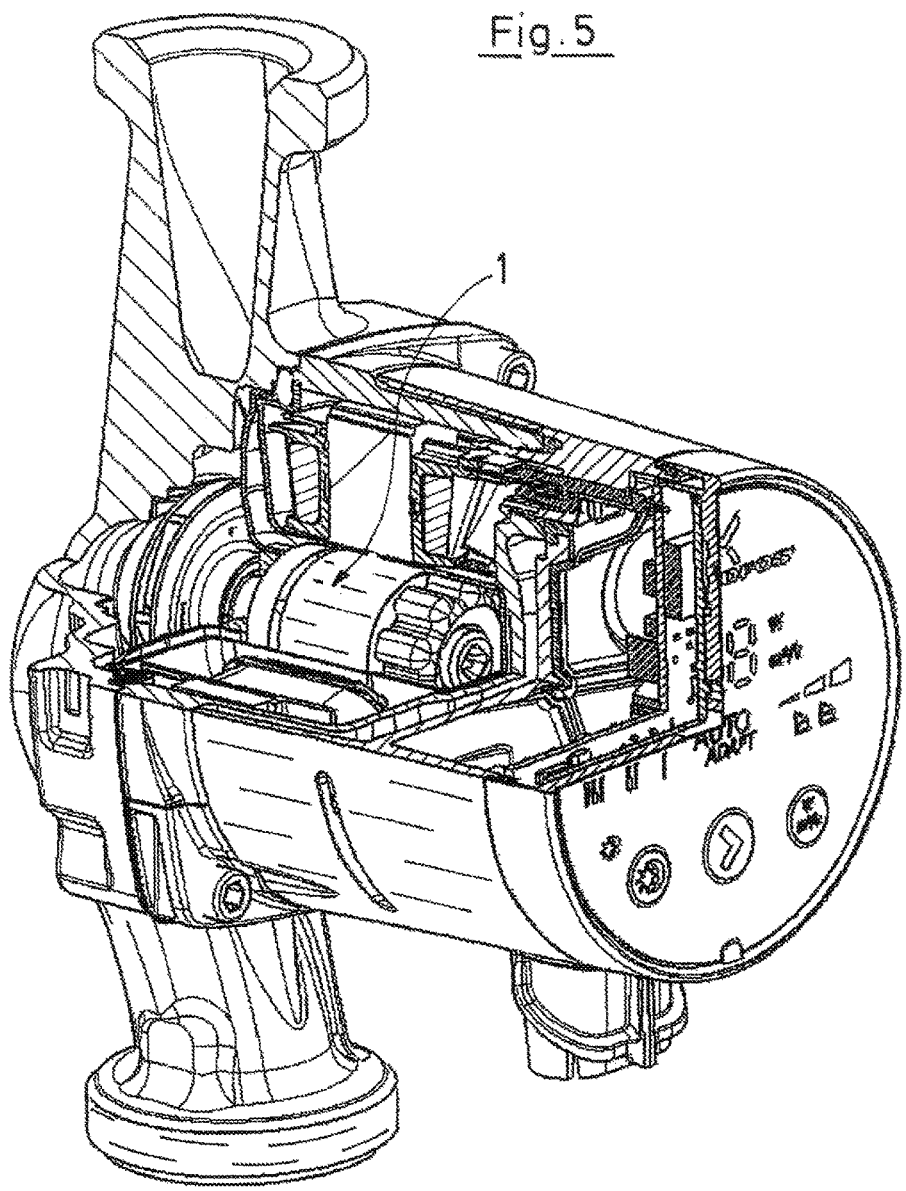
FIG. 5 is a pump assembly with a rotor according to FIGS. 1-4.

FIG. 5 shows a pump assembly whose electrical motor contains a rotor 1 as has also been described.

While specific embodiments of the invention have been shown and described in detail to illustrate the application of the principles of the invention, it will be understood that the invention may be embodied otherwise without departing from such principles.

The invention claimed is:

1. A rotor for an electric motor comprising:
a central rotor shaft formed of ceramic, the central rotor shaft having an outer periphery; the outer periphery having a profiling ground into a surface thereof, the profiling comprising grooves extending in two different directions; and
a permanent-magnetic rotor body fastened on the rotor shaft, wherein the rotor body comprises a casing which is radially distanced to the rotor shaft, and a first annular space, which is adjacent the casing and the first annular space is formed between the rotor shaft and the casing, the first annular space molded out with a plastic at least partly containing magnet particles, the rotor shaft surrounded by a soft-magnetic ring, the first annular space formed between an outer periphery of the soft-magnetic ring and the casing, wherein a second annular space is molded out with a plastic without magnetic particles, the second annular space formed between the soft-magnetic ring and the outer periphery of the rotor shaft, wherein at least the first annular space of the rotor body is covered by shrouds on axial end sides thereof, the rotor shaft being located at a spaced location from the shrouds.

2. A rotor for an electric motor comprising:
a central rotor shaft formed of ceramic, the central rotor shaft having an outer periphery; the outer periphery having a profiling ground into a surface thereof, the profiling comprising grooves extending in two different directions; and
a permanent-magnetic rotor body fastened on the rotor shaft, wherein the rotor body comprises a casing which is radially distanced to the rotor shaft, and a first annular space, which is adjacent the casing and the first annular space is formed between the rotor shaft and the casing, the first annular space molded out with a plastic at least partly containing magnet particles, the rotor shaft surrounded by a soft-magnetic ring, the first annular space formed between an outer periphery of the soft-magnetic ring and the casing, wherein a second annular space is molded out with a plastic without magnetic particles, the second annular space formed between the soft-magnetic ring and the outer periphery of the rotor shaft, wherein at least the first annular space of the rotor body is covered by shrouds on axial end sides thereof, each of the shrouds only extending between the casing and the soft-magnetic ring.

3. A rotor according to claim 2, wherein the casing is elastically and/or plastically deformed by way of the molding-in of the plastic.

4. A rotor according to claim 2, wherein the casing is manufactured of stainless steel.

5. A rotor according to claim 2, wherein the casing has a closed peripheral surface.

6. A rotor according to claim 2, wherein the shroud is formed of metal, the second annular space is not covered by the shrouds.

7. A rotor according to claim 2, wherein each of the shrouds is welded to at least one of the casing, the rotor shaft and the soft-magnetic ring surrounding the rotor shaft, wherein a width of each of the shrouds is equal to a width of the first annular space, the first annular space being sealed via at least a portion of the casing, at least a portion of each of the shrouds and at least a portion of the ring such that fluid is prevented from entering the first annular space.

8. A rotor according to claim 2, wherein the magnet particles contain ferrite or neodymium.

9. A rotor according to claim 2, wherein the rotor shaft is located at a spaced location from the shrouds.

10. A rotor according to claim 2, wherein the plastic at least partly containing magnet particles in the first annular space defines a first annular ring structure and the plastic in the second annular space defines a second annular ring structure, the soft-magnetic ring comprising a soft-magnetic ring inner surface, the casing comprising an annular casing inner surface, the first annular ring structure comprising a first annular ring structure outer surface and a first annular ring structure inner surface, the first annular ring structure outer surface located radially outward of the first annular ring structure inner surface with respect to a longitudinal axis of the rotor shaft, the first annular ring structure inner surface in direct contact with the outer periphery of the soft-magnetic ring, the first annular ring structure outer surface in direct contact with the annular casing inner surface, the second annular ring structure comprising a second annular ring structure outer surface and a second annular ring structure inner surface, the second annular ring structure outer surface located radially outward of the second annular ring structure inner surface with respect to the longitudinal axis of the rotor shaft, the second annular ring structure inner surface being in direct contact with the rotor shaft, the second annular ring structure outer surface being in direct contact with the soft-magnetic ring inner surface.

11. A rotor according to claim 10, wherein the soft-magnetic ring is located between the first annular ring structure and the second annular ring structure, the first annular ring structure located at a first distance from the longitudinal axis of the rotor shaft, the second annular ring structure located at a second distance from the longitudinal axis of the rotor shaft, the first distance being greater than the second distance.

12. An electric motor comprising:
a central rotor shaft comprising ceramic material, the central rotor shaft having an outer ceramic periphery; the outer ceramic periphery having a rotor shaft profiling comprising rotor shaft grooves extending in two different directions; and
a permanent-magnetic rotor body fastened on the rotor shaft, the rotor body comprising a casing spaced a radial distance from the rotor shaft, and a first annular space, adjacent to the casing, defined between the casing and the rotor shaft, wherein the first annular space is at least partially filled, by a molding process, with a plastic containing magnet particles, the rotor shaft surrounded by a soft-magnetic ring, the first annular space formed between an outer periphery of the soft-magnetic ring and the casing, wherein a second annular space is molded out with a plastic free of magnet particles, the second annular space defined between the soft-magnetic ring and the outer periphery of the rotor shaft;

a plurality of shrouds connected to the casing and the ring, one of the shrouds being arranged on one axial side of the casing with respect to a longitudinal axis of the casing, another one of the shrouds being arranged on another axial side of the casing with respect to the longitudinal axis of the casing, the plurality of shrouds defining at least a portion of the first annular space, wherein the plastic containing magnet particles in the first annular space defines a first annular ring structure and the plastic in the second annular space defines a second annular ring structure, the first annular ring structure in direct contact with the casing and the soft-magnetic ring, the second annular ring structure in direct contact with the soft-magnetic ring and the rotor shaft, the first annular ring structure located radially outward of the second annular ring structure with respect to a longitudinal axis of the rotor shaft, wherein the soft-magnetic ring is located between the first annular ring structure and the second annular ring structure, each of the plurality of shrouds only extending between the casing and the soft-magnetic ring, wherein the second annular space is not covered by the plurality of shrouds, wherein each of the plurality of shrouds has a shroud width, the shroud width being equal to a width of the first annular space, at least a portion of each of the plurality of shrouds, at least a portion of the casing and at least a portion of the soft-magnetic ring sealing the first annular space such that fluid is prevented from entering the first annular space.

13. An electric motor according to claim 12, in combination with pump elements to form a pump assembly.

14. A method for manufacturing a rotor for an electric motor, the method comprising the steps of:

applying a casing surrounding a ceramic rotor shaft, the ceramic rotor shaft comprising an outer ceramic peripheral surface, the outer ceramic surface comprising grooves extending in two different directions in a radially distanced manner, into an injection molding tool, so that a first annular space is formed adjacent the casing on an inner side of the casing facing the rotor shaft; and injecting a plastic containing magnet particles into the first annular space, wherein a soft-magnetic ring surrounding the rotor shaft at a distance is applied with the rotor shaft into the injection molding tool, and a second annular space is formed between the soft-magnetic ring and the rotor shaft, the second annular space being molded out with a plastic free of magnet particles, wherein the first annular space is formed between an outer periphery of the soft-magnetic ring and the casing;

covering one axial end of the first annular space with a first shroud;

covering another axial end of the first annular space with a second shroud, wherein the plastic containing magnet particles in the first annular space defines a first annular ring structure and the plastic in the second annular space defines a second annular ring structure, the soft-magnetic ring comprising a soft-magnetic ring inner surface, the casing comprising an annular casing inner surface, the first annular ring structure comprising a first annular ring structure outer surface and a first annular ring structure inner surface, the first annular ring structure outer surface located radially outward of the first annular ring structure inner surface with respect to a longitudinal axis of the rotor shaft, the first annular ring structure inner surface in direct contact with the outer periphery of the soft-magnetic ring, the first annular ring structure outer surface in direct contact with the annular casing inner surface, the second annular ring structure comprising a second annular ring structure outer surface and a second annular ring structure inner surface, the second annular ring structure outer surface located radially outward of the second annular ring structure inner surface with respect to the longitudinal axis of the rotor shaft, the second annular ring structure inner surface in direct contact with the rotor shaft, the second annular ring structure outer surface in direct contact with the soft-magnetic ring inner surface, at least one of the soft-magnetic ring inner surface and the annular casing inner surface comprising a first profiling, wherein at least a portion of the first shroud, at least a portion of the second shroud, at least a portion of the soft-magnetic ring and at least a portion of the casing seal the first annular space such that fluid is prevented from entering the first annular space, the soft-magnetic ring being located between the first annular ring structure and the second annular ring structure, the first annular ring structure located at a first distance from the longitudinal axis of the rotor shaft, the second annular ring structure located at a second distance from the longitudinal axis of the rotor shaft, the first distance being greater than the second distance, another one of the soft-magnetic ring inner surface and the annular casing inner surface comprising a second profiling, each of the first shroud and the second shroud only extending between the casing and the soft-magnetic ring, wherein the second annular space is not covered by the first shroud and the second shroud, wherein each of the first shroud and the second shroud has a shroud width, the shroud width being equal to a width of the first annular space.

15. A method according to claim 14, wherein firstly the second annular space is molded out and in a second step the first annular space is molded out, the grooves extending in a peripheral direction and obliquely to the peripheral direction.

16. A method according to claim 14, wherein the rotor shaft, the soft-magnetic ring and the casing are applied into the injection molding tool before molding out the second annular space, at least one of an inner periphery of the soft magnetic ring and an inner periphery of the casing comprising a profiling on a surface thereof.

* * * * *